US010308101B2

(12) United States Patent
Kim et al.

(10) Patent No.: US 10,308,101 B2
(45) Date of Patent: Jun. 4, 2019

(54) HYBRID TONNEAU COVER

(71) Applicant: GM Global Technology Operations LLC, Detroit, MI (US)

(72) Inventors: Wonhee M. Kim, Royal Oak, MI (US); Paul W. Alexander, Ypsilanti, MI (US); Julien P. Mourou, Bloomfield Hills, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 18 days.

(21) Appl. No.: 15/728,072

(22) Filed: Oct. 9, 2017

(65) Prior Publication Data
US 2019/0105973 A1 Apr. 11, 2019

(51) Int. Cl.
*B60P 7/02* (2006.01)
*B60J 7/12* (2006.01)
*B60J 7/185* (2006.01)

(52) U.S. Cl.
CPC ............... *B60J 7/12* (2013.01); *B60J 7/1858* (2013.01)

(58) Field of Classification Search
CPC .................................. B60J 7/12; B60J 7/1858
See application file for complete search history.

(56) References Cited

U.S. PATENT DOCUMENTS

| 2014/0312647 | A1* | 10/2014 | Wang ....................... B60J 11/04 296/136.02 |
| 2015/0107233 | A1* | 4/2015 | Ou ......................... F15B 15/10 60/327 |
| 2018/0312046 | A1* | 11/2018 | Hutchens, III ....... B01J 37/0215 |

FOREIGN PATENT DOCUMENTS

WO    WO-2016100182 A1 *  6/2016  ............... A61F 5/01

* cited by examiner

*Primary Examiner* — Lori L Lyjak
(74) *Attorney, Agent, or Firm* — Quinn IP Law

(57) ABSTRACT

A tonneau cover for a cargo bed of a truck includes a rail system, and a panel secured to the rail system. At least a portion of the rail system or the panel is a layer jamming member having a layer jamming material operable to exhibit a first stiffness in response to a first confining pressure and a second stiffness in response to a second confining pressure. The layer jamming member may include all or a portion of the panel to provide specific regions of the cover, and/or may include portions of the rail system.

20 Claims, 3 Drawing Sheets

HYBRID TONNEAU COVER

INTRODUCTION

The disclosure generally relates to a vehicle and a tonneau cover for the vehicle.

Pick-up trucks include a cargo bed having side walls that form a cargo storage space. Some users choose to install a tonneau cover over the cargo bed. The tonneau cover includes a rail system that attaches to the side walls of the cargo bed, and a panel that attaches to the rail system. Some types of tonneau covers include a soft, flexible panel made from, for example, a vinyl fabric. Such flexible tonneau covers may be supported by a support bar spanning across the cargo bed. Other types of tonneau covers include a rigid panel made from, for example, a rigid plastic. Such rigid tonneau covers are often segmented into portions that are interconnected by hinges and fold up in an accordion fashion.

SUMMARY

A vehicle is provided. The vehicle includes a body. The body has a plurality of side walls and a bottom wall that cooperate to form a cargo storage space. A cover is removably attached to the side walls for covering the cargo storage space. The cover includes at least one layer jamming member having a layer jamming material. The layer jamming material is operable to exhibit a first stiffness in response to a first confining pressure, and a second stiffness in response to a second confining pressure.

In one aspect of the vehicle, the cover includes at least one of a rail, a hinge, a support bar, and a panel. The at least one layer jamming member includes at least one of the rail, the hinge, the support bar, and the panel.

In another aspect of the vehicle, the layer jamming material includes a plurality of friction layers positioned one atop another to form a stack of friction layers. The first confining pressure generates a first friction force between the plurality of friction layers to provide the first stiffness. The second confining pressure generates a second friction force between the plurality of friction layers to provide the second stiffness. The layer jamming material includes a flexible enclosure containing the plurality of friction layers.

In one aspect of the vehicle, the cover includes a panel having a first portion and a second portion. In one embodiment, the layer jamming member includes the first portion of the panel, and the second portion of the panel does not include a layer jamming material. In another embodiment, the layer jamming member includes a first layer jamming member and a second layer jamming member. The first layer jamming member includes the first portion of the panel, and the second layer jamming member includes the second portion of the panel. The first layer jamming member and the second layer jamming member may be independently operable relative to each other, between their respective first stiffness and second stiffness.

In one aspect of the vehicle, the cover includes a rail removably attached to the side walls of the body, with the layer jamming member including the rail. In another aspect of the vehicle, the rail includes a first rail segment, a second rail segment, and a hinge interconnecting the first rail segment and the second rail segment, with the layer jamming member including the hinge. In another aspect of the vehicle, the cover includes a support bar spanning across the cargo storage space, with the layer jamming member including the support bar.

In another aspect of the vehicle, the vehicle includes a negative pressure pump that is selectively controlled to provide at least one of the first confining pressure or the second confining pressure. A connector interconnects the negative pressure pump and the layer jamming member. The connector is operable to communicate a negative pressure between the negative pressure pump and the at least one layer jamming member.

In another aspect of the vehicle, the vehicle includes a cover control unit connected to the negative pressure pump. The cover control unit is operable to control the negative pressure pump to provide either the first confining pressure or the second confining pressure to the at least one layer jamming member. In one embodiment, the cover control unit includes a wireless remote control device.

A tonneau cover for a cargo bed of a truck is also provided. The tonneau cover includes a rail system that is configured for attachment to the cargo bed of the truck, and a panel secured to the rail system for covering the cargo bed. The tonneau cover further includes at least one layer jamming member having a layer jamming material that is operable to exhibit a first stiffness in response to a first confining pressure and a second stiffness in response to a second confining pressure. The layer jamming member includes at least a portion of one of the rail system or the panel.

In one aspect of the tonneau cover, the layer jamming material includes a plurality of friction layers positioned one atop another to form a stack of friction layers. The first confining pressure generates a first friction force between the plurality of friction layers to provide the first stiffness. The second confining pressure generates a second friction force between the plurality of friction layers to provide the second stiffness. A flexible enclosure contains the plurality of friction layers.

In one aspect of the tonneau cover, the panel includes a first portion and a second portion. In one embodiment, the layer jamming member includes the first portion of the panel, and the second portion of the panel does not include a layer jamming material. In another embodiment of the tonneau cover, the at least one layer jamming member includes a first layer jamming member and a second layer jamming member. The first layer jamming member includes the first portion of the panel, and the second layer jamming member includes the second portion of the panel. The first layer jamming member and the second layer jamming member are independently operable relative to each other.

Accordingly, the layer jamming member may be controlled between the first stiffness, for example a high stiffness providing a rigid panel, and the second stiffness, for example a low stiffness providing a flexible panel. The layer jamming member may be configured as a part of the tonneau cover to provide different characteristics and benefits. For example, the layer jamming member may be the panel, and may be controlled between the first stiffness to provide a rigid panel providing added security and fuel efficiency benefits, and the second stiffness to provide a flexible panel allowing for easy access to the cargo storage space and for storing the tonneau cover. Other portions or components of the tonneau cover may be configured as the layer jamming member, such as the rails of the rail system, the support bar of the rail system, hinges of the rail system, etc.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the FIGS., wherein like numerals indicate like parts throughout the several views, a vehicle is generally shown at 20. The vehicle 20 may include a type of vehicle 20 having a body 22 that defines a cargo storage area 24. Referring to the Figures, the vehicle 20 is embodied as a pick-up truck having a cargo bed defining the cargo storage area 24. However, it should be appreciated that the vehicle 20 may include some other type or style of moveable platform, other than the exemplary embodiment of the pick-up truck shown and described herein.

Figure 1:
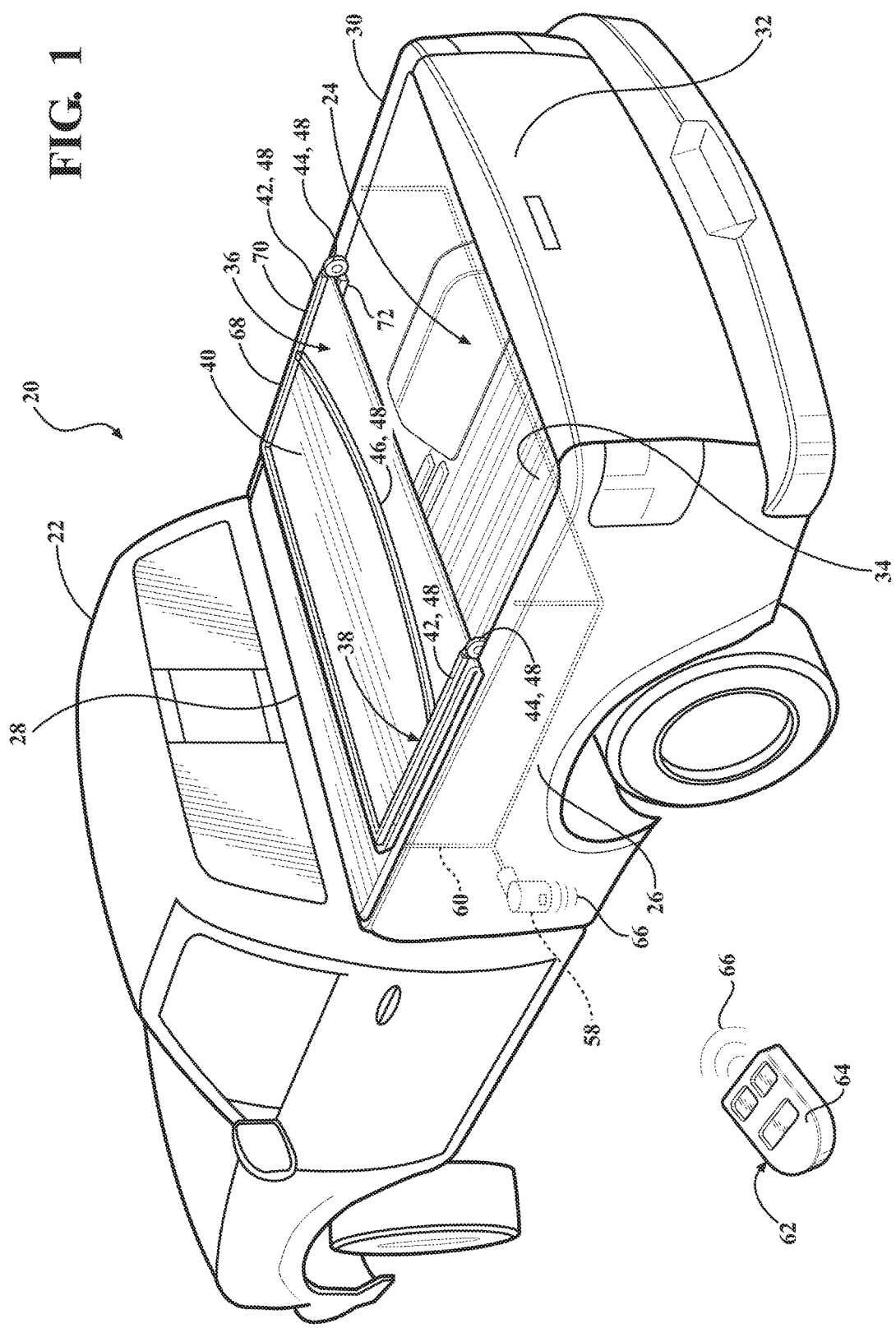
FIG. 1 is a schematic perspective view of a vehicle showing a tonneau cover in a first position.
Figure 2:
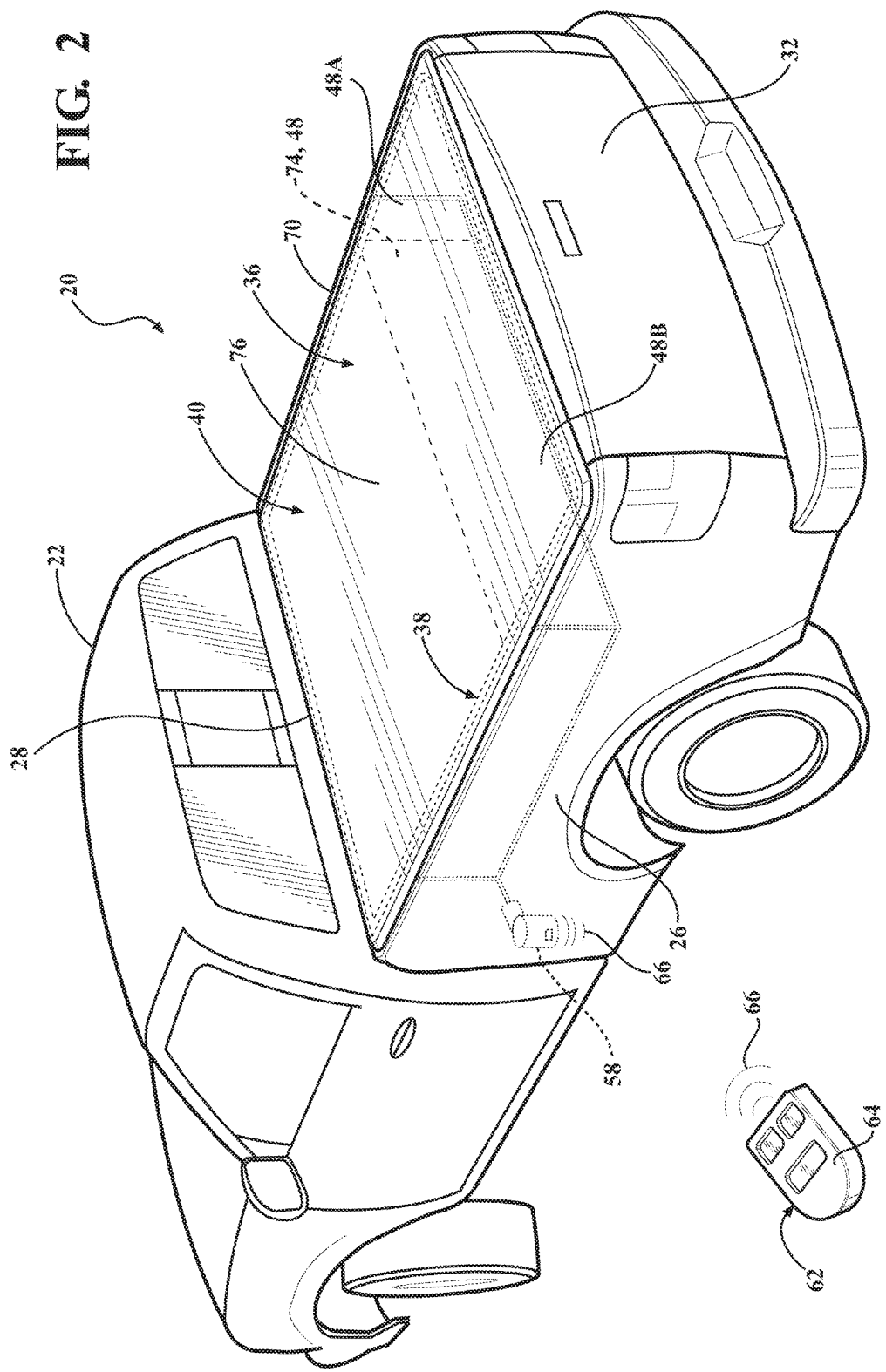
FIG. 2 is a schematic perspective view of the vehicle showing the tonneau cover in a second position.

Referring to the FIGS. 1 and 2, the body 22 includes a plurality of side walls 26, 28, 30, 32. The side walls 26, 28, 30, 32 include a first side wall 26, a second side wall 28, a third side wall 30, and a fourth side wall 32. As shown in the exemplary embodiment, the fourth side wall 32 may alternatively be described as a tailgate. The body 22 further includes a bottom wall 34 (shown in FIG. 1). The side walls 26, 28, 30, 32 and the bottom wall 34 cooperate to form the cargo storage space. In the exemplary embodiment shown in the Figures and described herein, the cargo storage space may be described as an open air cargo bed of the pick-up truck, because the body 22 does not form or include a roof or top to the cargo bed.

A tonneau cover 36 is attached to the body 22 of the vehicle 20. The tonneau cover 36 provides a top or cover 36 for the cargo storage space, i.e., the cargo bed of the pick-up truck in the exemplary embodiment. The tonneau cover 36 may be referred to hereinafter as the cover 36. The cover 36 is removeably attached to the side walls 26, 28, 30, 32 for selectively covering the cargo storage space.

The tonneau cover 36 may include a rail system 38 and a panel 40. The rail system 38 may include, but is not limited to, one or more rails 42, one or more hinges 44, and one or more support bars 46. Generally, the rails 42 are attached to the side walls 26, 28, 30, 32 of the body 22, with the panel 40 attached to the rails 42. The rails 42 may be attached to the body 22 in a suitable manner, such as with clamps, screws, bolts, clips, etc. The panel 40 may be attached to the rails 42 in a suitable manner, such as with snaps, sliding locks, hook and loop fasteners, etc. The hinges 44 may be used to connect different sections of the rails 42. The support bars 46 are attached to the rails 42, and span across the cargo storage area 24, between opposing rails 42, in order to support the panel 40. The support bars 46 may be attached to the rails 42 in a suitable manner, such as but not limited to interlocking fixtures. The specific configuration and orientation of the components of the tonneau cover 36 will vary for different applications, and for different vehicle 20s. As such, the specific configuration of the rail system 38, including the rails 42, hinges 44, and support bars 46, is not described in detail herein. It should be appreciated that the rail system 38 may be configured in an orientation suitable to cover the cargo storage space of the vehicle 20, and may be configured differently than the exemplary embodiment shown in the Figures. For example, the tonneau cover 36 may be configured to provide a camper shell having sides and that extend upward from the side walls 26, 28, 30, 32 of the body 22.

Figure 3:
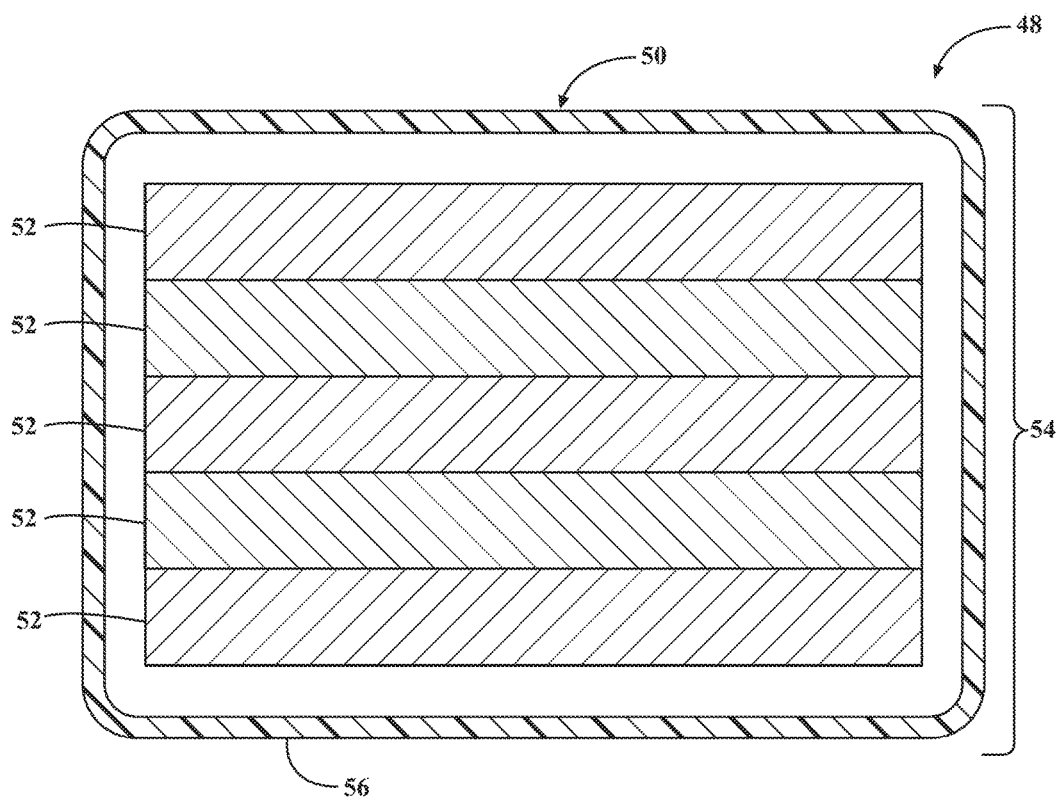
FIG. 3 is a schematic cross sectional side view of a layer jamming member of the tonneau cover.

At least one portion of the rail system 38 or the panel 40 is a layer jamming member 48. The layer jamming member 48 includes a layer jamming material 50 that is operable to exhibit a first stiffness in response to a first confining pressure, and a second stiffness in response to a second confining pressure. Referring to FIG. 3, an exemplary cross section of the layer jamming member 48 is schematically shown. The layer jamming member 48 shown in FIG. 3 may represent the cross section of the layer jamming member 48 embodied as any of the possible components of the cover 36 described in greater detail below. The layer jamming member 48 includes the layer jamming material 50. The layer jamming material 50 includes a plurality of friction layers 52 positioned one atop another to form a stack 54 of friction layers 52. As is understood by those skilled in the art, layer jamming materials 50 include a flexible enclosure 56 containing the plurality of friction layers 52 inside. The flexible enclosure 56 provides an air-tight chamber to maintain the first confining pressure or the second confining pressure. As used herein, the term "confining pressure" is defined as a force applied to the friction layers 52 to compress the friction layers 52 together. The Layer jamming material 50 uses negative air pressure, i.e., a vacuum to create the confining pressure, to pack the thin friction layers 52 together in order to amplify the friction between each of the friction layers 52, and thereby increase the relative shear stress experienced by the plurality of friction layers 52, which results in a higher structural system stiffness. The construction and operation of layer jamming materials 50 are understood by those skilled in the art, and are therefore are not described in detail herein.

The first confining pressure generates a first friction force between the plurality of friction layers 52 to provide the first stiffness. The second confining pressure generates a second friction force between the plurality of friction layers 52 to provide the second stiffness. At least one of the first confining pressure and the second confining pressure may be referred to as a vacuum pressure or negative air pressure. In an exemplary embodiment, the first confining pressure may be defined as a negative air pressure having a first value, and the second confining pressure may be defined as a negative air pressure having a second value, with the second value nearer atmospheric pressure than the first value. In other embodiments the second confining pressure may include or be defined as atmospheric pressure. Because the first confining pressure is greater than the second confining pressure, the first stiffness is higher or greater than the second stiffness. In one exemplary embodiment, the first stiffness is sufficient so that the layer jamming member 48 exhibits a rigid, generally non-flexible form, whereas the second stiffness enables the layer jamming member 48 to exhibit a flexible, bendable form.

Referring to FIGS. 1 and 2, the exemplary embodiment of the vehicle 20 includes a negative pressure pump 58. The negative pressure pump 58 may include, but is not limited to, a vacuum pump or other similar device that is capable of generating or providing the first confining pressure and/or the second confining pressure. The negative pressure pump 58 is selectively controlled or actuated to provide at least one of the first confining pressure or the second confining pressure to the layer jamming member 48.

A connector 60 interconnects the negative pressure pump 58 and the layer jamming member 48. The connector 60 is operable to communicate a negative pressure between the negative pressure pump 58 and the layer jamming member 48. The connector 60 may include, but is not limited to, a hose, tubing, piping, etc., and may additionally include fixtures necessary to secure the connector 60 to the negative pressure pump 58 and the layer jamming member 48.

The vehicle 20 may further include a cover control unit 62. The cover control unit 62 is connected to the negative pressure pump 58, and is operable to control the negative pressure pump 58 to provide either the first confining pressure or the second confining pressure to the layer jamming member 48. In one embodiment, the cover control unit 62 may include a simple electrical switch, for example located in a cab of the pick-up truck of the exemplary embodiment. Actuation of the switch may turn the negative pressure pump 58 on or off as desired. In other embodiments, the cover control unit 62 may include a wireless remote control device 64, such as but not limited to, a key fob or other similar hand held electronic device. The remote control device 64 is connected to the negative pressure pump 58 via a wireless connection 66. The remote control device 64 may be configured to actuate or control the negative pressure pump 58 remotely from the vehicle 20, similar to a remote key start system or a remote door lock/unlock system.

As noted above, the cover 36 includes at least one layer jamming member 480. More specifically, at least one portion or component of either the rail system 38 or the panel 40 is a layer jamming member 48 made from the layer jamming material 50 described above. FIG. 1 shows the layer jamming member 48 as being one or more parts of the rail system 38, whereas FIG. 2 shows the layer jamming member 48 as being part of the panel 40. Although every possible component that may be formed to define the layer jamming member 48 is not specifically labeled in FIGS. 1 and 2, it should be appreciated that any component of the cover 36 described herein may be constructed from the layer jamming material 50 to form the layer jamming member 48. As noted above, the rail system 38 includes one or more rails 42, one or more hinges 44, and one or more support bars 46. The layer jamming member 48 may include a rail 42 or a portion of the rail 42, a hinge 44 or a portion of the hinge 44, a support bar 46 or a portion of the support bar 46, the panel 40 or a portion of the panel 40. Accordingly, the layer jamming member 48 may include one or more of the rails 42, one or more of the support bars 46, one or more of the hinges 44, a portion of the panel 40, or a combination thereof.

For example, the rail system 38 may include a side rail 68 having a first rail segment 70 and a second rail segment 72 connected by a hinge 44. In one embodiment, the first rail segment 70 and/or the second rail segment 72 may be the layer jamming member 48. In another embodiment, the layer jamming member 48 may be the hinge 44 connecting the first rail segment 70 and the second rail segment 72. By configuring the hinge 44 as the layer jamming member 48, the hinge 44 may be controlled between the first stiffness and the second stiffness. For example, when the first confining pressure is applied to the layer jamming material 50 of the layer jamming member 48, the hinge 44 may exhibit the first stiffness, which may be a high stiffness forming a generally rigid, non-flexible structure. The hinge 44 may be controlled to exhibit the first stiffness in order to secure the first rail segment 70 and the second rail segment 72 in a desired position. In contrast, the second confining pressure may be applied to the layer jamming material 50 of the layer jamming member 48 so that the hinge 44 exhibits the second stiffness, which may be a low stiffness forming a generally flexible or bendable structure. The hinge 44 may be controlled to exhibit the second stiffness in order to allow the first rail segment 70 and the second rail segment 72 to bend or rotate about the hinge 44 to reposition the first rail segment 70 and the second rail segment 72 relative to each other.

In other embodiments, one or more of the support bars 46 may be configured as the layer jamming member 48. By configuring the support bars 46 as the layer jamming member 48, the shape of the panel 40 supported by the support bars 46 may be controlled. Additionally, the attachment of the support bars 46 to the rails 42 may be controlled. For example, the support bars 46 may be controlled to exhibit the first stiffness to provide an arched shape, and prevent dislodgement of the support bars 46 from the rails 42. In contrast, the support bars 46 may be controlled to exhibit the second stiffness to provide a flexible form that allows the support bars 46 to be removed from the rails 42.

In other embodiments, at least a portion of the panel 40 may be configured as the layer jamming member 48. For example, the entire panel 40 may be configured as the layer jamming member 48. By so doing, the panel 40 may be controlled between the first stiffness exhibiting a generally rigid, non-flexible form, and the second stiffness, exhibiting a flexible, bendable form. When exhibiting the first stiffness, the panel 40 provides a rigid cover 36, which increases fuel efficiency of the vehicle 20. When exhibiting the second stiffness, the panel 40 may be removed, bend, folded, etc., to provide access to the cargo storage area 24.

In another embodiment, Referring to FIG. 2, the panel 40 may include a first portion 74 and a second portion 76. In one embodiment, the first portion 74 of the panel 40 is the layer jamming member 48, and the second portion 76 of the panel 40 is not a layer jamming member and does not include a layer jamming material. By configuring the panel 40 to include the first portion 74 as the layer jamming member 48, and the second portion 76 that is not a layer jamming member, the first portion 74 of the panel 40 may be controlled to provide either the first stiffness or the second stiffness as desired. For example, the first portion 74 may include an end segment of the panel 40, and may be controlled between the first stiffness exhibiting a generally rigid, non-flexible form, and the second stiffness exhibiting a flexible, bendable form. By so doing, the first portion 74 may be controlled to the second stiffness to allow the end of the panel 40 to be disconnected from the rail system 38 to allow access to the cargo storage area 24, and may be controlled to the first stiffness to provide a rigid, non-flexible panel 40 surface for securing the panel 40 to the rail system 38 and limiting access to the cargo storage area 24.

In other embodiments, the cover 36 may include multiple layer jamming members 48. For example, referring to FIG. 2, the at least one layer jamming member 48 may include a first layer jamming member 48A and a second layer jamming member 48B. The first portion 74 of the panel 40 may include both the first layer jamming member 48A and the second layer jamming member 48B. In an exemplary embodiment, the first layer jamming member 48A and the second layer jamming member 48B are independently operable relative to each other, between their respective first stiffness and second stiffness. Accordingly, the first layer jamming member 48A and the second layer jamming member 48B are independently and separately controlled to receive either the first confining pressure or the second confining pressure respectively. As such, each of the first layer jamming member 48A and the second layer jamming member 48B may have a respective negative pressure pump 58 for their respective control and operation.

It should be appreciated that the cover 36 may be configured in many different configurations for many different applications, and that the scope of the disclosure is not limited to the exemplary shape and style of the cover 36 shown in the Figures and described herein. Furthermore, it should be appreciated that a portion or component of the cover 36, including a portion of the rail system 38 and/or the panel 40, may include and be manufactured from the layer jamming material 50 to form the layer jamming member 48.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle comprising:
    a body having a plurality of side walls and a bottom wall forming a cargo storage space; and
    a cover removably attached to the side walls for covering the cargo storage space, the cover including:
        at least one layer jamming member having a layer jamming material operable to exhibit a first stiffness in response to a first confining pressure and a second stiffness in response to a second confining pressure.

2. The vehicle set forth in claim 1, wherein the cover includes at least one of a rail, a hinge, a support bar, and a panel, and wherein the at least one layer jamming member includes at least one of the rail, the hinge, the support bar, and the panel.

3. The vehicle set forth in claim 1, wherein the layer jamming material includes a plurality of friction layers positioned one atop another to form a stack of friction layers, and wherein the first confining pressure is operable to generate a first friction force between the plurality of friction layers to provide the first stiffness, and the second confining pressure is operable to generate a second friction force between the plurality of friction layers to provide the second stiffness.

4. The vehicle set forth in claim 3, wherein the layer jamming material includes a flexible enclosure containing the plurality of friction layers.

5. The vehicle set forth in claim 1, wherein the cover includes a panel having a first portion and a second portion, and wherein the at least one layer jamming member includes the first portion of the panel.

6. The vehicle set forth in claim 5, wherein the second portion of the panel does not include a layer jamming material.

7. The vehicle set forth in claim 5, wherein the at least one layer jamming member includes a first layer jamming member and a second layer jamming member, with the first layer jamming member including the first portion of the panel, and the second layer jamming member including the second portion of the panel.

8. The vehicle set forth in claim 7, wherein the first layer jamming member and the second layer jamming member are independently operable relative to each other, between their respective first stiffness and second stiffness.

9. The vehicle set forth in claim 1, wherein the cover includes a rail removably attached to the side walls of the body, and wherein the at least one layer jamming member includes the rail.

10. The vehicle set forth in claim 1, wherein the cover includes a rail removably attached to the side walls of the body, with the rail including a first rail segment, a second rail segment, and a hinge interconnecting the first rail segment and the second rail segment, and wherein the at least one layer jamming member includes the hinge.

11. The vehicle set forth in claim 1, wherein the cover includes a support bar spanning across the cargo storage space, and wherein the at least one layer jamming member includes the support bar.

12. The vehicle set forth in claim 1, further comprising a negative pressure pump selectively controlled to provide at least one of the first confining pressure or the second confining pressure.

13. The vehicle set forth in claim 12, further comprising a connector interconnecting the negative pressure pump and the at least one layer jamming member and operable to communicate a negative pressure between the negative pressure pump and the at least one layer jamming member.

14. The vehicle set forth in claim 12, further comprising a cover control unit connected to the negative pressure pump and operable to control the negative pressure pump to provide either the first confining pressure or the second confining pressure to the at least one layer jamming member.

15. The vehicle set forth in claim 14, wherein the cover control unit includes a wireless remote control device.

16. A tonneau cover for a cargo bed of a truck, the tonneau cover comprising:
    a rail system configured for attachment to the cargo bed of the truck;
    a panel secured to the rail system for covering the cargo bed; and
    at least one layer jamming member having a layer jamming material operable to exhibit a first stiffness in response to a first confining pressure and a second stiffness in response to a second confining pressure;
    wherein the at least one layer jamming member includes at least a portion of one of the rail system or the panel.

17. The tonneau cover set forth in claim 16, wherein the layer jamming material includes:
    a plurality of friction layers positioned one atop another to form a stack of friction layers, wherein the first confining pressure is operable to generate a first friction force between the plurality of friction layers to provide the first stiffness, and the second confining pressure is operable to generate a second friction force between the plurality of friction layers to provide the second stiffness; and
    a flexible enclosure containing the plurality of friction layers.

18. The tonneau cover set forth in claim 16, wherein the panel includes a first portion and a second portion, wherein the at least one layer jamming member includes the first portion of the panel.

19. The tonneau cover set forth in claim 18, wherein the second portion of the panel does not include a layer jamming material.

20. The tonneau cover set forth in claim 18, wherein the at least one layer jamming member includes a first layer jamming member and a second layer jamming member, with the first layer jamming member including the first portion of the panel, and the second layer jamming member including the second portion of the panel, and wherein the first layer jamming member and the second layer jamming member are independently operable relative to each other.

\* \* \* \* \*